United States Patent [19]

Takizawa et al.

[11] Patent Number: 5,428,473
[45] Date of Patent: Jun. 27, 1995

[54] MIRROR DRIVING APPARATUS FOR OPTICAL DISK DRIVE

[75] Inventors: Teruyuki Takizawa, Neyagawa; Yoshikazu Goto, Hirakata; Toshiyuki Shimada, Kadoma, all of Japan

[73] Assignee: Matsushita Electric Industrial Co., Ltd., Osaka, Japan

[21] Appl. No.: 43,780

[22] Filed: Apr. 6, 1993

[30] Foreign Application Priority Data

Apr. 6, 1992 [JP] Japan .................. 4-083576

[51] Int. Cl.⁶ ........................... G02B 26/08
[52] U.S. Cl. ......................... 359/199; 359/213; 359/224; 310/75 R
[58] Field of Search ............ 359/212–214, 359/220, 223, 224–226, 871, 872, 876, 877, 196–199; 250/230, 234–236; 369/44.22, 44.15, 44.16; 310/75 R; 365–366; 318/126–128

[56] References Cited

U.S. PATENT DOCUMENTS

| | | | |
|---|---|---|---|
| 4,264,809 | 4/1981 | Fearnside | 250/201 |
| 4,330,880 | 5/1982 | Van Dijk | 369/32 |
| 4,423,496 | 12/1983 | Opheij et al. | 369/46 |
| 4,466,088 | 8/1984 | Trethewey | 369/46 |
| 4,556,964 | 12/1985 | Trethewey | 369/44 |
| 4,564,757 | 1/1986 | LaBudde et al. | 250/239 |

FOREIGN PATENT DOCUMENTS

| | | |
|---|---|---|
| 0084727 | 8/1983 | European Pat. Off. |
| 61-202111 | 9/1986 | Japan. |
| 02011287 | 1/1990 | Japan. |

*Primary Examiner*—Ricky D. Shafer
*Assistant Examiner*—James Phan
*Attorney, Agent, or Firm*—Wenderoth, Lind & Ponack

[57] ABSTRACT

A mirror driving apparatus includes a rotary mirror, a support member for rotatably supporting the rotary mirror, a driving section for rotating the rotary mirror, a rotary electrode mounted on the rotary mirror or the support member, a fixed electrode disposed close to the rotary electrode and generally parallel thereto, a fixing section to which the support member and the fixed electrode are mounted, and a detecting section for detecting electrostatic capacity or a variation thereof between the rotary electrode and the fixed electrode. A mechanical vibration system, formed by the rotary mirror and the rotary mirror support member, is controlled based on the amount of rotary movement of the rotary mirror detecting as a change in capacity between the electrodes to suppress resonance of the rotary mirror. Additionally, by superposing an additional high frequency component outside the control band onto the rotary mirror control signal, the rotary mirror can be moved in fine increments. Thus, a dead band region (hysteresis characteristic) of the mechanical vibration system is limited.

11 Claims, 9 Drawing Sheets

MIRROR DRIVING APPARATUS FOR OPTICAL DISK DRIVE

BACKGROUND OF THE INVENTION

1. Field of the Invention

The present invention generally relates to a driving system and more particularly, to an apparatus for driving a tracking mirror for moving a light spot with respect to recording tracks on a disk.

2. Description of the Related Art

Recently reducing the weight of the movable portion of an optical head has been made the subject of a very important study on how to attain high speed access to an optical disk.

The above study has deemed a system in which tracking control is effected by a rotary type mirror (galvano-mirror) to be most effective in facilitating high speed access to the disk.

Specifically, such a system does not employ a tracking driving device conventionally mounted on the movable portion of the optical head, whereby the weight of the optical head is comparatively less.

With respect to the above, the following tracking control systems have been proposed.

(1) U.S. Pat. No. 4,330,880 to Ate Van Dijk (May 18, 1982) entitled "Apparatus for optically reading a disc-shaped record carrier in particular for rapidly locating a desired program section" discloses that high speed access can be attained by tracking effected by a galvano-mirror.

(2) U.S. Pat. No. 4,423,496 to Willem G. Opheij et al. (Dec. 27, 1983) entitled "Apparatus for reading and/or writing an optically readable information structure" discloses that, by detecting the amount of rotation of a mirror through the use of a photo-reflector, and using a signal from the photo-reflector as a correction signal for position control, a more stable tracking control servo may be realized.

Additionally, because the accuracy of the control depends on the accuracy of the detection of the amount the mirror has rotated, various mirror displacement detecting apparatuses employing light have been proposed, for example, as follows.

(1) U.S. Pat. No. 4,466,088 to Paul M. Trethewey et al. (Aug. 14, 1984) entitled "Galvo position sensor for track selection in optical data disk system" discloses an arrangement in which a second auxiliary reflecting mirror is provided adjacent the reflecting side of a galvano-mirror, and light reflected from the second reflecting mirror, the reflecting side of the galvano-mirror, and then light from the second reflecting mirror is monitored to achieve higher sensitivity.

Subsequently, one example of conventional mirror driving apparatuses will be described.

In FIGS. 8(a), 8(b), 8(c), and FIGS. 9(a), 9(b), the known mirror driving apparatus generally includes a rotary mirror 1, a plate or leaf spring 2 to one surface of which the rotary mirror 1 is bonded, and a driving coil 3 which is bonded to the other surface of the plate spring 2. A winding axis of the coil 3 extends vertically. A rotary section 4 is thus constituted by the rotary mirror 1, plate spring 2 and driving coil 3. Opposite end portions of the plate spring 2, disposed along a rotary axis 6 of the rotary section 4, are bonded to a housing 5 so that the rotary section 4 may be rotated in directions indicated by arrow 9. A permanent magnet 7 is fixed in the housing 5 within an opening of the driving coil 3, and is magnetized in a direction 8 perpendicular to the rotary axis 6 of the rotary section 4 and parallel to a mirror surface of the rotary mirror 1.

In FIGS. 10(a) and 10(b), a tracking control signal 31 is applied to a driving circuit 10 which drives the driving coil 3 at a current value proportional to a voltage value of the tracking control signal 31. An objective lens 12 converges laser light 13 reflected by the rotary mirror 1 to form a light spot 14 on the track of an optical disk 11. The tracking direction is denoted by arrow 15. The driving circuit 10 may be a voltage-current converter which drives the driving coil 3 with current proportional to the tracking control signal, and therefore, a detailed description thereof is omitted here for the sake of brevity.

The operation of the mirror driving apparatus will be described hereinbelow.

In the first place, for causing the light spot 14 to follow the tracks on the optical disk 11, the tracking control signal 31 is applied to the driving circuit 10 of the mirror driving apparatus as a target driving signal of the tracking mirror driving apparatus. Subsequently, a driving signal corresponding to the tracking control signal 31 is passed through the driving coil 3, which is subjected to an electromagnetic force corresponding to the tracking control signal 31 from the permanent magnet 7. As a result, the rotary section 4 constituted by the rotary mirror 1, the plate spring 2, and the driving coil 3 is rotated in direction 9 about the rotary axis 6. Accordingly, the angle at which the laser light 13 is reflected by the rotary mirror 1 is altered. Consequently, the angle of incidence of the laser light 13 on the objective lens 12 is altered, thus displacing the light spot 14 in the tracking direction 15 of the optical disk 11 (FIG. 10(a)).

By the above function, tracking control in the optical disk apparatus can be realized.

However, the conventional mirror driving apparatus has a problem due to the fact that a mechanical vibrating system, in which the rotary section 4 is supported at opposite ends of the plate spring 2, is used. Specifically, the resonance of the rotary section 4 cannot be suppressed, and thus, stable tracking cannot be ensured.

Meanwhile, altering the value of the initial resonance frequency is often carried out by adding a mechanical damper, for example, by sticking damper members to the rotary portion of the plate spring, etc. Although the resonance may be suppressed by such a practice, there is a drawback in that the rotary section 4 cannot be rapidly restored to its initial position, with a consequent increase of a dead band region (hysteresis characteristic) of the rotary mirror 1, thus making it impossible to maintain the initial position of the rotary mirror 1.

SUMMARY OF THE INVENTION

Accordingly, an essential object of the present invention is to provide a mirror driving apparatus which is capable of suppressing resonance of a rotary mirror without increasing a dead band region (hysteresis characteristic) of the rotary mirror.

Another object of the present invention is to provide a mirror driving device which has a simple structure, which functions stably with high reliability, and which can be readily manufactured at a low cost.

In accomplishing these and other objects, the present invention provides a mirror driving apparatus which includes a rotary mirror, a support member for rotatably supporting the rotary mirror, a driving section for rotating the rotary mirror, a rotary electrode mounted on the rotary mirror or the support member, a fixed electrode disposed close to the rotary electrode but spaced a small distance therefrom and extending generally parallel thereto, a fixing section to which the support member and fixed electrode are mounted, and a detecting section for detecting the electrostatic capacity between the rotary electrode and the fixed electrode.

The present invention also provides a mirror driving apparatus including a rotary mirror, a support member for rotatably supporting the rotary mirror, a driving section for rotating the rotary mirror, a driving electrical circuit controlling the driving section, and an adder for superposing an additional high frequency component of a specific frequency onto a rotary mirror driving control signal applied to the driving section by the driving electrical circuit.

By employing the rotary electrode that rotates together with the rotary mirror and the fixed electrode confronting the rotary electrode, the electrostatic capacity between the rotary electrode and the fixed electrode can be detected to determine the amount of rotation of the rotary mirror with high sensitivity. Moreover, it becomes possible to apply an electrical feedback control to the rotary mirror driving section based on the detection signal. By applying speed feedback control to the mechanical elements in general, it is known that the resonance of the mechanical elements may be suppressed. Accordingly, by applying the speed feedback control to the rotary mirror of the present invention, which is a mechanical element, the initial resonance frequency in the rotating direction of the rotary mirror can be avoided. Further, because the rotary section is supported at its opposite ends (ends of the plate spring), it becomes possible to minimize the dead band region (hysteresis characteristic) of the rotary mirror. Furthermore, by forming one electrode as a charging film (i.e. an electret film), the variation of the electrostatic capacity between the rotary electrode and the fixed electrode as the rotary mirror rotates is enhanced, thereby yielding an electrostatic capacity detecting section that is highly sensitive. Moreover, because the electrostatic capacity detection system detects the amount of rotation of the mirror based on the variation in the electrostatic capacity, disturbance factors such as temperature drifts, noises, etc. have less of an influence as compared with other sensors (e.g. optical sensors), and the apparatus can be manufactured more compact and at a lower cost than if the apparatus were to employ other sensors. Furthermore, by superposing an additional high frequency component, outside the ordinary rotary mirror control band region, on the rotary mirror driving control signal, the rotary mirror may be moved in fine increments. Thus, non-linear characteristics such as stationary friction, etc. can be eliminated. Consequently, the dead band region (hysteresis characteristic) of the mechanical vibrating system constituted by the rotary mirror and the mirror support member can be further reduced, and the initial setting of the rotary mirror can be accurately and stably maintained at all times.

BRIEF DESCRIPTION OF THE DRAWINGS

These and other objects and features of the present invention will become apparent from the following description taken in conjunction with the preferred embodiments thereof with reference to the accompanying drawings in which.

DETAILED DESCRIPTION OF THE PREFERRED EMBODIMENTS

Figure 1A:
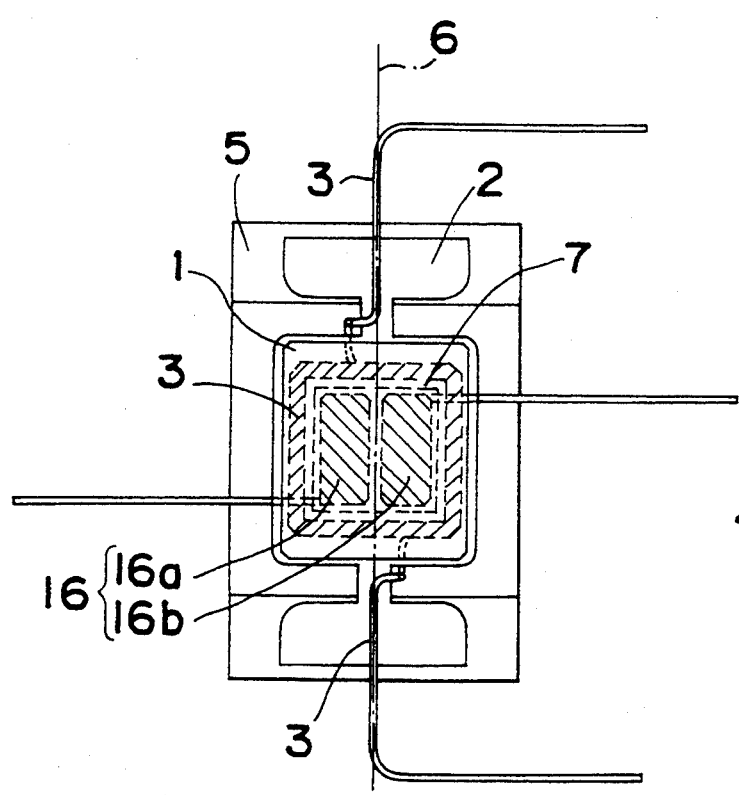
FIGS. 1(a), 1(b) and 1(c) are sectional views of one preferred embodiment of a mirror driving apparatus according to the present invention.
Figure 1C:
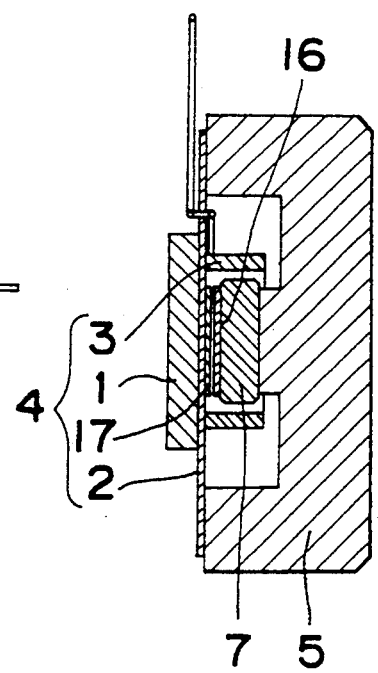
Figure 1B:
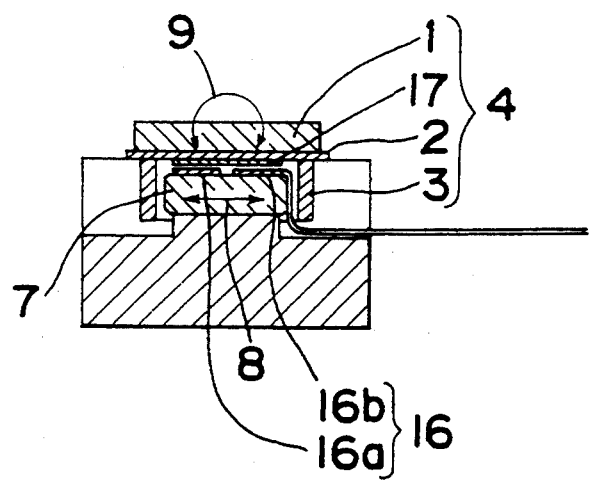
Figure 2A:
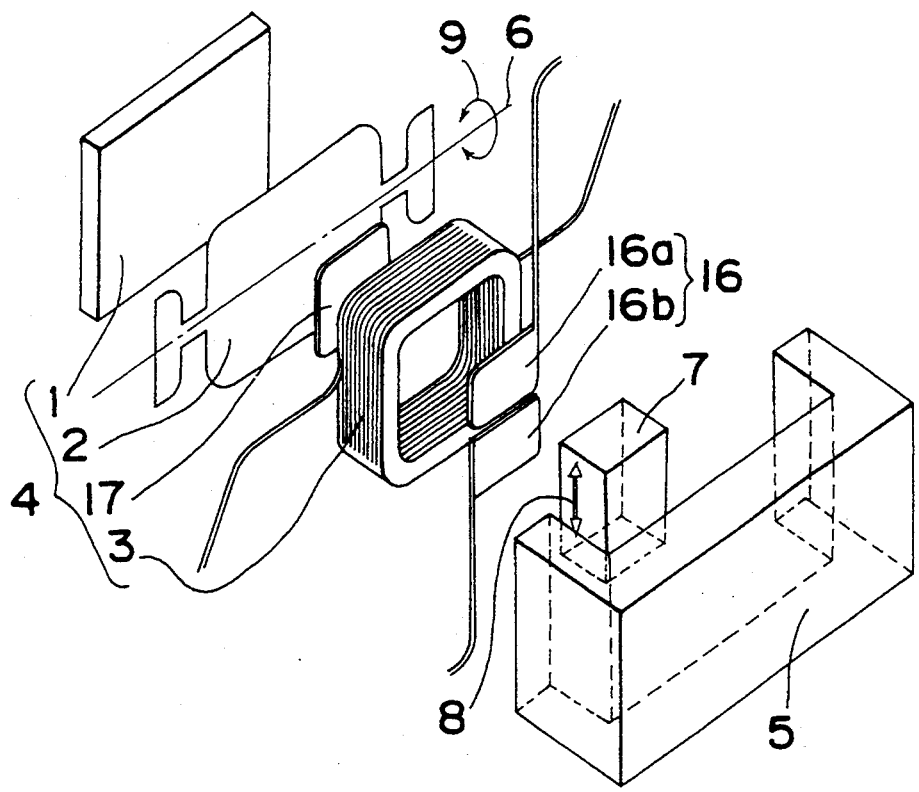
FIGS. 2(a) and 2(b) are exploded perspective views of the mirror driving apparatus according to the present invention.
Figure 2B:
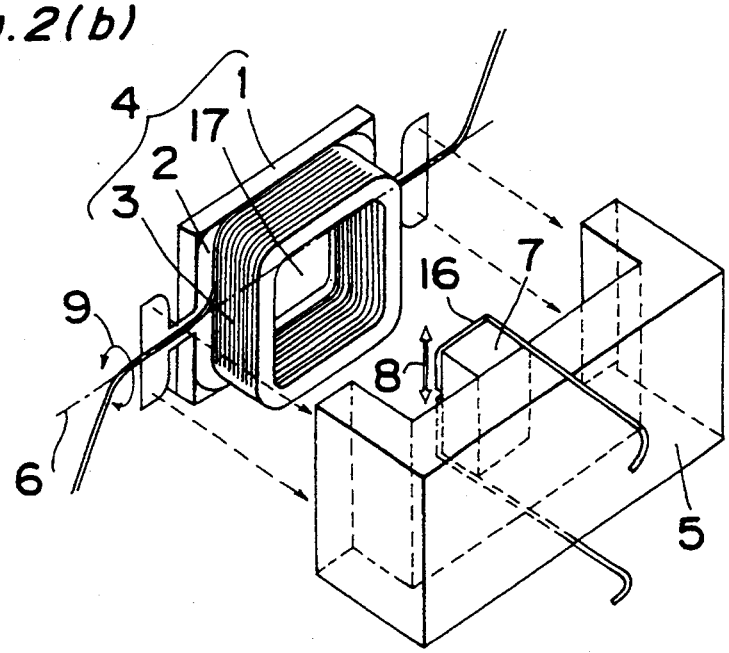

Before the description of the present invention proceed, it is to be noted that like parts are designated by like reference numerals throughout the accompanying drawings.

FIGS. 1(a), 1(b), 1(c), and FIGS. 2(a) and 2(b), show one preferred embodiment of a mirror driving apparatus according to the present invention, which generally includes a rotary mirror 1, a leaf spring or a plate spring 2 to one surface of which the rotary mirror 1 is bonded, and a driving coil 3 which is bonded to the other surface of the plate spring 2 fixed to the rotary mirror 1. A winding axis of the coil 3 extends vertically. A rotary section 4, i.e. the rotatable part of the apparatus, is formed by the rotary mirror 1, plate spring 2, driving coil 3, and a rotary electrode 17 which is disposed in an opening formed in the driving coil 3 and is fixed to the plate spring 2. Opposite end portions of the plate spring 2, disposed along a rotary or rotational axis 6 of the rotary section 4, are bonded to a housing 5 so that the rotary section 4 may be rotated in directions indicated by arrow 9. A permanent magnet 7 is fixed in the housing 5 as disposed within the opening of the driving coil 3, and is magnetized in a direction 8 perpendicular to the rotary axis 6 of the rotary section 4 and parallel to a mirror surface of the rotary mirror 1. Positions 16a, 16b of a fixed electrode 16 are disposed generally parallel and close to each other across a very small space from the rotary electrode 17, are insulated with respect to the permanent magnet 7, and are spaced apart in a direction perpendicular to the rotary axis 6 of the rotary section 4 and parallel to a mirror surface of the rotary mirror 1.

Figure 3:
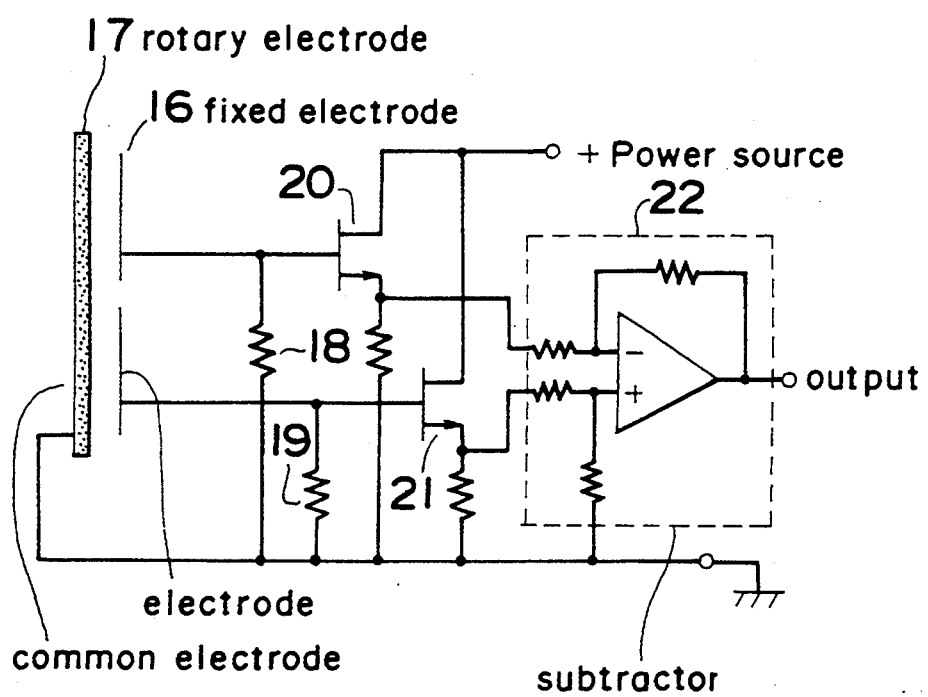
FIG. 3 is a schematic diagram of a first example of a mirror-position detecting circuit.

In FIG. 3 showing one example of the detecting section of the mirror driving device according to the present invention, the portions 16a, 16b of the fixed electrode 16 are coupled to a + power source and a subtractor 22, constituted by four resistors and one operational amplifier, through field effect transistors 20 and 21 (FET), and to a line extending from the rotary electrode 17 to the ground through resistors 18, 19, etc. Thus, the detecting circuit outputs a detecting signal by detecting a variation of electrostatic capacity between the set 16 of the fixed electrodes and the rotary electrode 17.

Still referring to FIGS. 1(a), 1(b), 1(c), FIGS. 2(a) and 2(b), and FIG. 3, the operation of the mirror driving apparatus will be described hereinbelow.

First, however, the fabrication of the mirror driving apparatus according to the present invention but excluding the detecting section will be described. The permanent magnet 7 is first bonded to the housing 5 fixed on an optical disc chassis (not shown), and the fixed electrode 16 having two spaced apart portions 16a and 16b made of conductive material and bonded to an insulative plate is bonded to one side of the permanent magnet 7. In the drawing, respective electrode lead-out lines are shown extending from the electrodes 16a and 16b. The rotary mirror 1 is bonded to one side of the plate spring 2, and the rotary electrode 17 which is a charging film (e.g. an electret film) and the coil 3 are bonded to the other side of the plate spring 2. The connection of this rotary electrode 17 in the detecting circuit is effected through the plate spring 2 which is a conductor. Further, the plate spring 2 is fixed to the housing 5. Accordingly, an electromagnetic force produced in the driving section, constituted by the permanent magnet 7 and the coil 3, rotates the rotary mirror 1 together with the rotary electrode 17 in the direction indicated by arrow 9 about the rotary axis 6.

Figure 5:
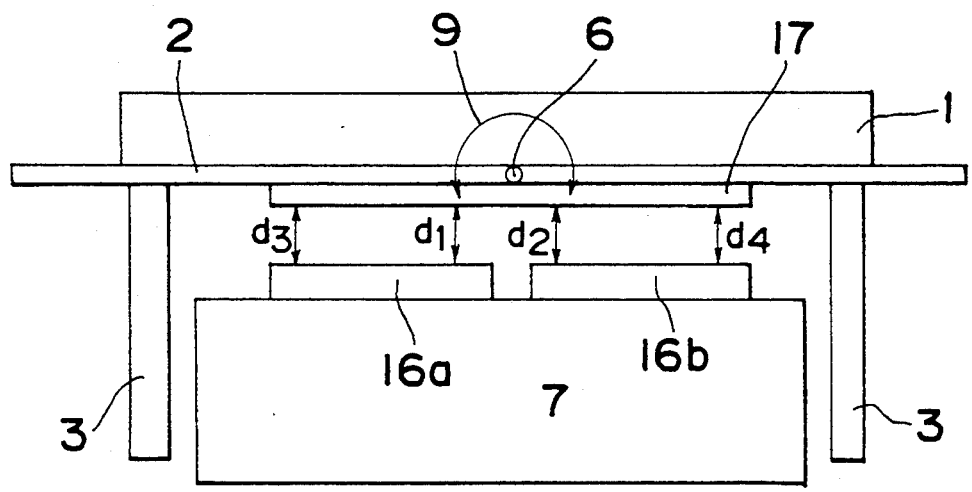
FIG. 5 is a first detailed diagram of electrodes.

In the electrode configuration illustrated in FIG. 5, the fixed electrode portions 16a and 16b are disposed on opposite sides of the rotary axis 6.

When the rotary mirror 1 is rotated in the rotating direction 9, since the fixed electrode 16 is divided into two portions 16a and 16b spaced apart in a direction perpendicular to the rotary axis 6 of the rotary section 4 and parallel to the mirror surface of the rotary mirror 1, a distance d1 between the rotary electrode 17 and the fixed electrode portion 16a, and a distance d2 between the rotary electrode 17 and the fixed electrode portion 16b vary inversely during operation. Accordingly, since the electrostatic capacity between the electrodes varies inversely with the distance between the electrodes, the electrostatic capacity C1 between the rotary electrode 17 and the fixed electrode portion 16a, and the electrostatic capacity C2 between the rotary electrode 17 and the fixed electrode portion 16b also vary inversely to each other. In FIG. 5, the width of the rotary electrode 17 is about 8 mm, the electrodes 16a and 16b each have surface areas of about 32 mm$^2$, the distance d1 and d2 between electrodes during a non-operating time of the rotary section 4 are approximately 150 microns, and thus, the electrostatic capacities C1 and C2 are about 1.8 PF. Meanwhile, since the maximum rotational range of the rotary mirror 4 may be generally 0.1 degrees based on the optical head specification, the electrostatic capacities C1 and C2 during operation vary by about ±2.3%.

Referring again to FIG. 3, because an electrical charge of about 200 volts is preliminarily applied to the rotary electrode 17 which is a charging film (e.g. the electret film), a charge corresponding to said electrical charge and opposite in polarity is excited in the fixed electrode portions 16a and 16b confronting the rotary electrode 17. Due to the fact that the rotation of the rotary electrode 17 gives rise to variations in the electrostatic capacities C1 and C2, the charge excited in the fixed electrodes 16a and 16b are applied across the resistors 18 and 19. Thus, voltage variations corresponding to the variations of the electrostatic capacities C1 and C2 appear across the resistors 18 and 19, respectively. The field effect transistors 20 and 21 function as voltage followers of high input resistance and take out such voltages across the resistors while the subtractor 22 outputs the difference therebetween.

By providing the rotary electrode which is displaced together with the rotary mirror, the fixed electrodes confronting the rotary electrode, and the detecting section for detecting the variation in the electrostatic capacity produced between the rotary electrode and said fixed electrodes, the amount of displacement of the rotary mirror may be detected with a high degree of accuracy.

Figure 10A:
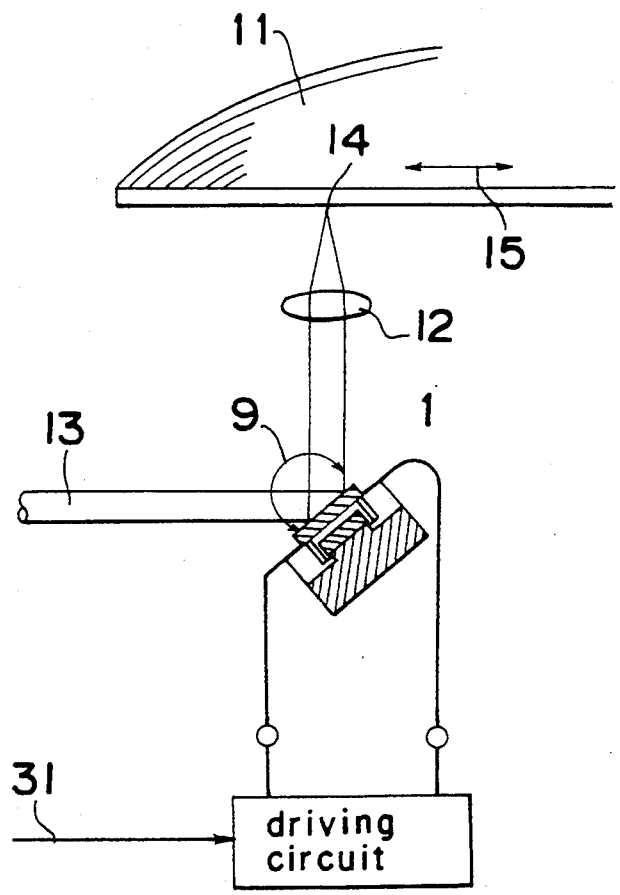
FIGS. 10(a) and 10(b) are diagrams for explaining functions of the conventional mirror driving apparatus.
Figure 10B:
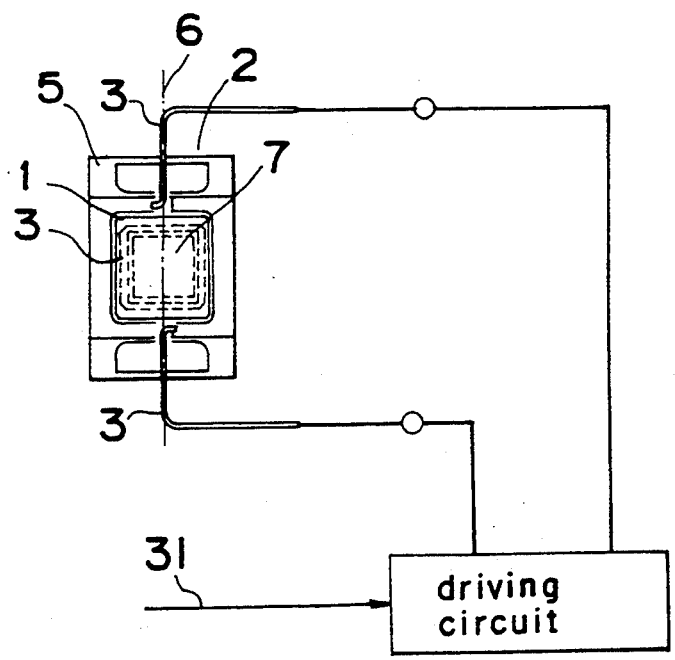

It is to be noted that because the driving of the rotary section 4 is carried out in a manner generally similar to that employed in the conventional mirror driving apparatus described with reference to FIGS. 10(a) and 10(b), etc., a detailed description thereof is omitted here for the sake of brevity.

Figure 4:
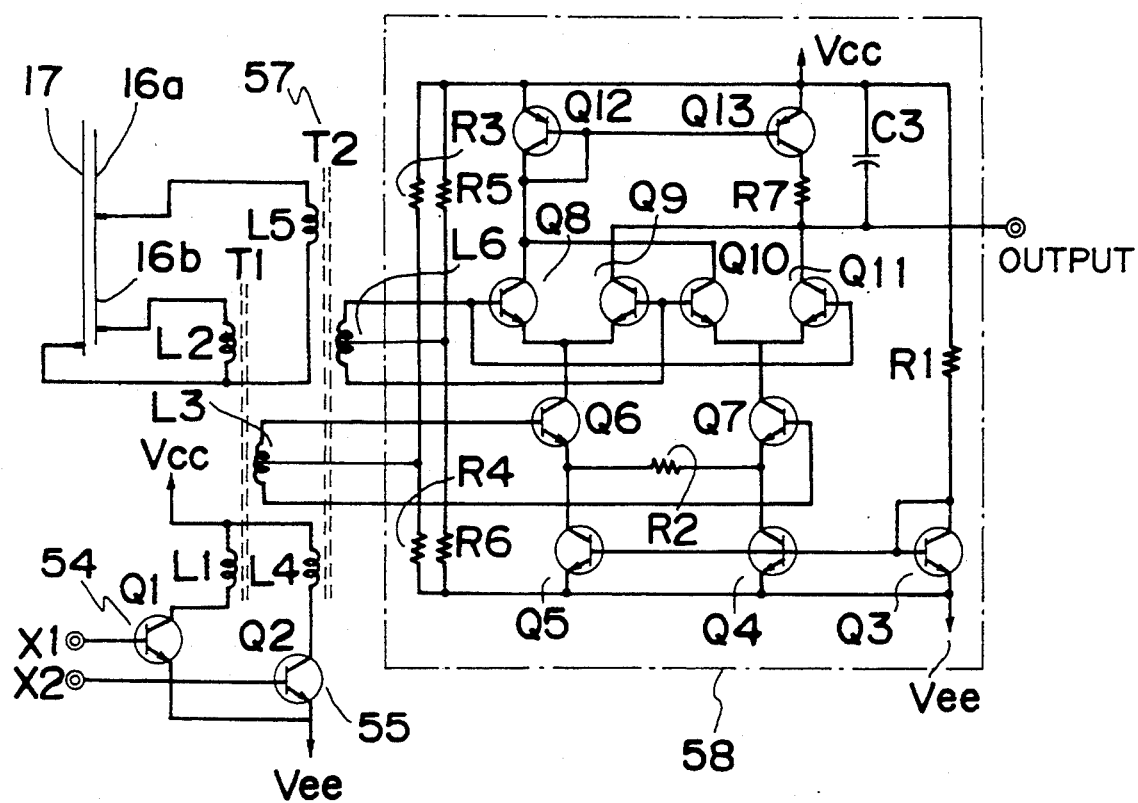
FIG. 4 is a schematic diagram of a second example of a mirror-position detecting circuit.

Reference is now made to FIG. 4 showing the circuit of a detecting section of a second embodiment of the present invention.

In the detecting section shown in FIG. 4, the fixed electrode portions 16a and 16b and the rotary electrode 17 are coupled (1) to transistors 54 and 55 serving as amplifiers for driving coils L1 and L2 using bi-phase input signals X1 and X2 having a phase difference of 90° at the same specific frequency, (2) to a transformer T1 in which the primary coil L1, resonance coil L2 and a secondary coil L3 are magnetically coupled, (3) to a transformer T2 at 57 in which the primary coil L4, resonance coil L5, and secondary coil L6 are also magnetically coupled, and (4) to a multiplier 58 including transistors Q3 to Q13, resistors R1 to R7, and capacitor C3 connected to each other as illustrated, and leading to a positive power supply Vcc and a negative power supply Vee.

In the first place, high frequency current is caused to flow to the primary side coils L1 and L4 by the amplifiers 54 and 55. The resonance coils L2 and L5, respectively, constitute resonance circuits due to the electrostatic capacity C1 between the fixed electrode portion 16a and the rotary electrode 17, and the electrostatic capacity C2 between the fixed electrode portion 16b and the rotary electrode 17. Here, the frequency for the specific high frequency signal is set in the vicinity of the resonance frequency. With respect to the function of the transformers T1 and T2, the phase characteristic for the transfer characteristic from the primary coils L1 and L2 to the secondary coils L3 and L4 is to vary by the resonance circuit of the resonance coil L3 and the electrostatic capacity C1, and the resonance circuit of the resonance coil 4 and the electrostatic capacity C2. Because the electrostatic capacities C1 and C2 are varied inversely by the rotation of the rotary mirror as referred to earlier, the phase of the high frequency signal excited in the secondary coils L3 and L6 will vary according to the variation of the electrostatic capacity due to the rotation of the rotary mirror.

With respect to the function of the multiplier 58, the transistors Q3, Q4 and Q5 constitute a current mirror circuit, and bias current for the transistors Q4 and Q5 is determined by the transistor Q3 and the resistor R1. The bias current for the transistors Q4 and Q5 is divided into current flowing through the transistors Q7 and Q6 through the resistor R2, produced by the high frequency signal excited in the secondary coil L3. Here, the resistors R3 and R4 are intended to apply proper bias voltage to the transistors Q6 and Q7. The divided current as referred to above is further divided into currents flowing to the transistors Q10 and Q11 and to the transistors Q8 and Q9 by the high frequency signal excited across the secondary coil L6. The transistors Q12 and Q13 constitute a current mirror circuit, and the added value of the currents for the transistors Q8 and Q10 is to flow through the resistor R7. Further, because the currents of the same value as those flowing through the transistors Q9 and Q11 also flow through the resistor R7, a voltage proportional to the current value obtained by subtracting the current of the transistors Q9 and Q11 from the current of the transistors Q8 and Q10 is produced as the output. Moreover, because the capacity C1 is connected to resistor R7, this current value is outputted as being subjected to low pass filtering.

On the assumption that t represents time, $\omega$ denotes angular frequency of the high frequency signal described earlier, $\phi1$ and $\phi2$ are phase components of high frequency signals respectively excited in the secondary coils L3 and L6, the high frequency signal excited in the secondary coil L3 is denoted by $\sin(\omega t + \phi1)$ as an approximation, and the high frequency signal excited in the second coil L6 is also represented by $\sin(\omega t + \phi2)$ by taking into consideration that the phase is different by 90°, the output of the multiplier 58 will be represented as:

$$\sin(\omega t + 1 \cdot \cos(\omega t + \phi2) = \tfrac{1}{2}(\sin(\phi1 - \phi2)) + \sin(2\omega t + \phi1 + \phi2)$$

By the effect of C1 as referred to earlier, the second term at the right side of the above equation which is the high frequency component of the output of the multiplier 58 is eliminated, and only the first term which is the low frequency component is outputted. Accordingly, the multiplier 58 is to output, approximately, the phase difference of the high frequency signals excited by the second coils L3 and L6.

By the above series of operations, when the electrostatic capacity is varied by the rotation of the rotary mirror, a phase variation takes place for the second coils L3 and L6, and the phase difference thereof is further detected from the output.

As described above, the circuit of FIG. 4 allows the electrostatic capacity variation caused by the rotation of the rotary mirror to be detected. The circuit of FIG. 4 is different from that of FIG. 3 in that the detection of the electrostatic capacities C1 and C2 is adapted to be effected based on A.C. current. In the circuit of FIG. 3, it is difficult to detect a variation of electrostatic capacity at a very low frequency component in the vicinity of D.C. region. However in the system for detecting the electrostatic capacity in terms of A.C. as shown in FIG. 4, an electrostatic capacity substantially similar to D.c. can be detected, and thus, the detecting sensitivity at the low frequency region is comparatively higher.

As is readily seen from the foregoing description, the detecting sensitivity corresponds to the ratio of variations of the electrostatic capacity, i.e. the ratio of the electrostatic capacity while the plate spring is stationary to the electrostatic capacity while the plate spring is rotating. In other words, in FIG. 5, the distances between the rotary electrode 17 and the fixed electrode portions 16a and 16b affect the detection sensitivity. More specifically, in the configuration of FIG. 5 it is clear that distances d1 and d2 near the rotary axis 6 vary to a smaller extent than the distances d3 and d4 at the outer side of the electrode during operation. Consequently, the efficiency of the system is adversely affected.

Figure 6:
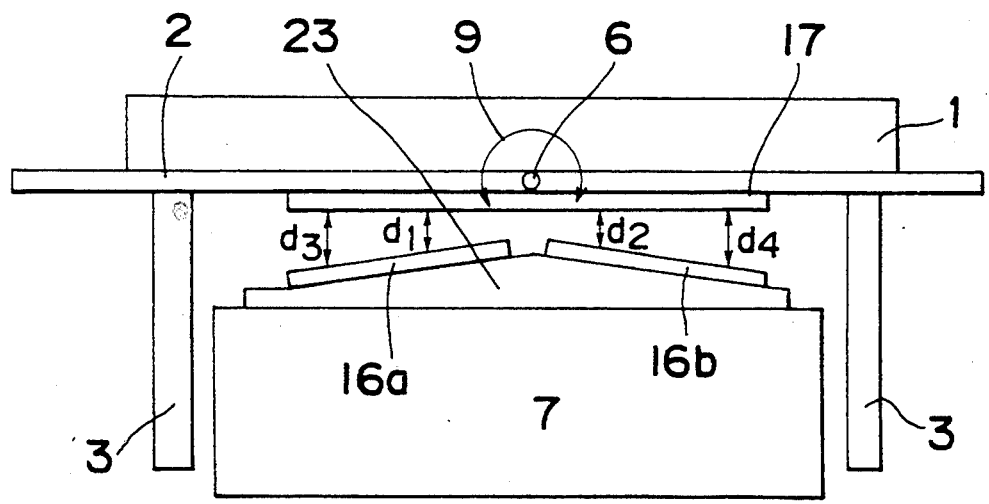
FIG. 6 is a second detailed diagram of electrodes.

In another arrangement of the rotary electrode 17 and the fixed electrode portions 16a and 16b shown in FIG. 6, the fixed electrodes 16a and 16b are fixed on surfaces, respectively, of an insulative member 23 which extend generally radially with respect to the rotary axis 6. Such a configuration has a comparatively higher detecting sensitivity.

Figure 7:
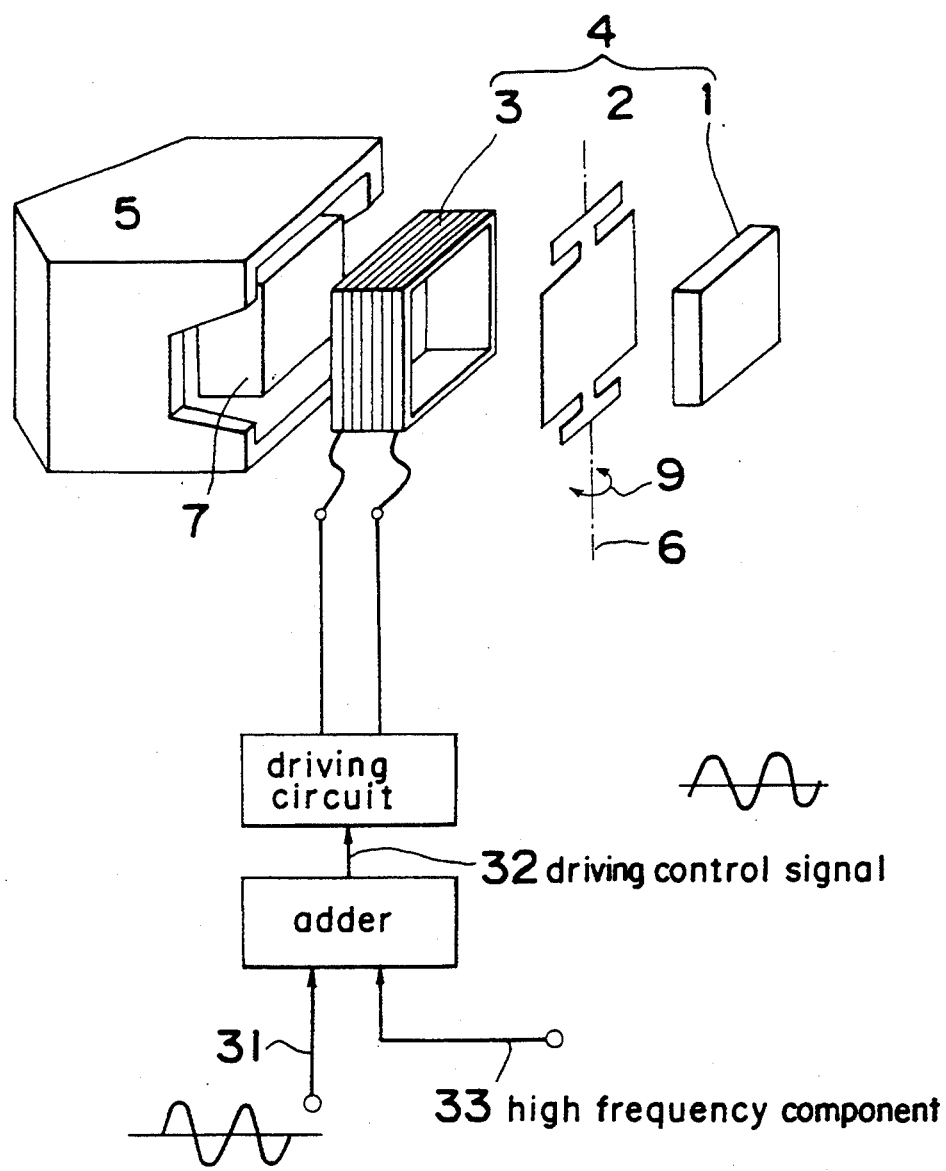
FIG. 7 is an exploded perspective view of a second embodiment of the present invention.
Figure 8A:
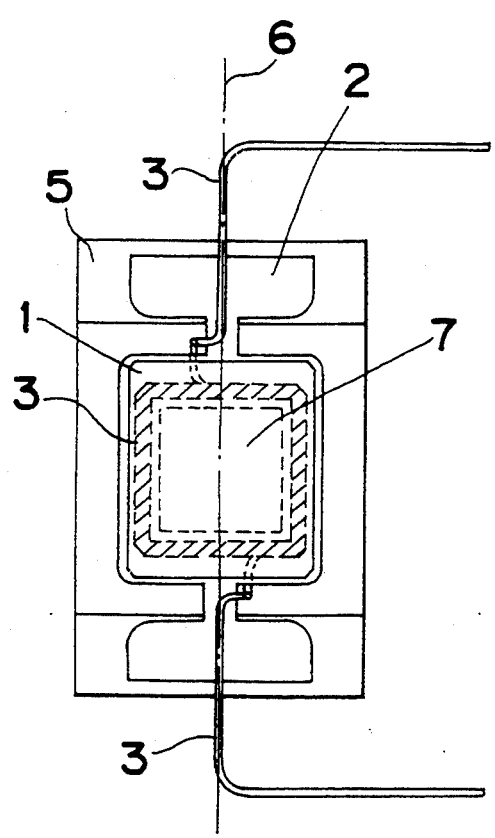
FIGS. 8(a) to 8(c) are sectional views similar to FIGS. 1(a), 1(b) and 1(c), which particularly show a conventional mirror driving apparatus.
Figure 8C:
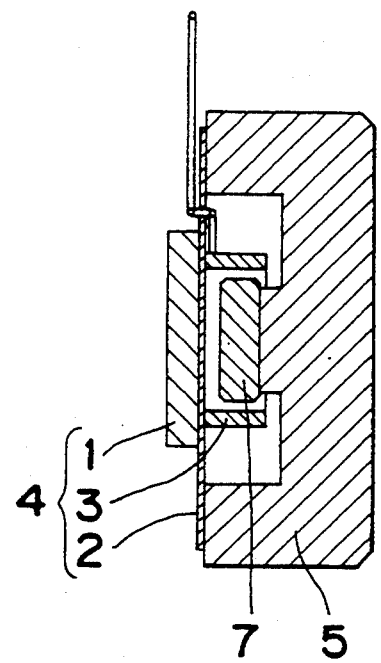
Figure 8B:
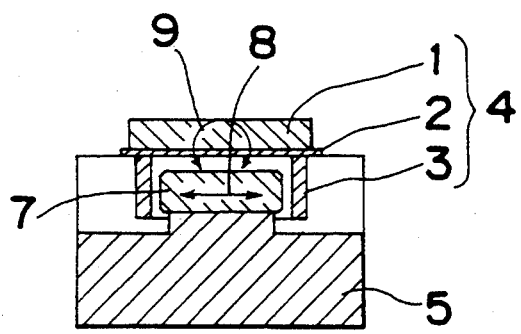
Figure 9A:
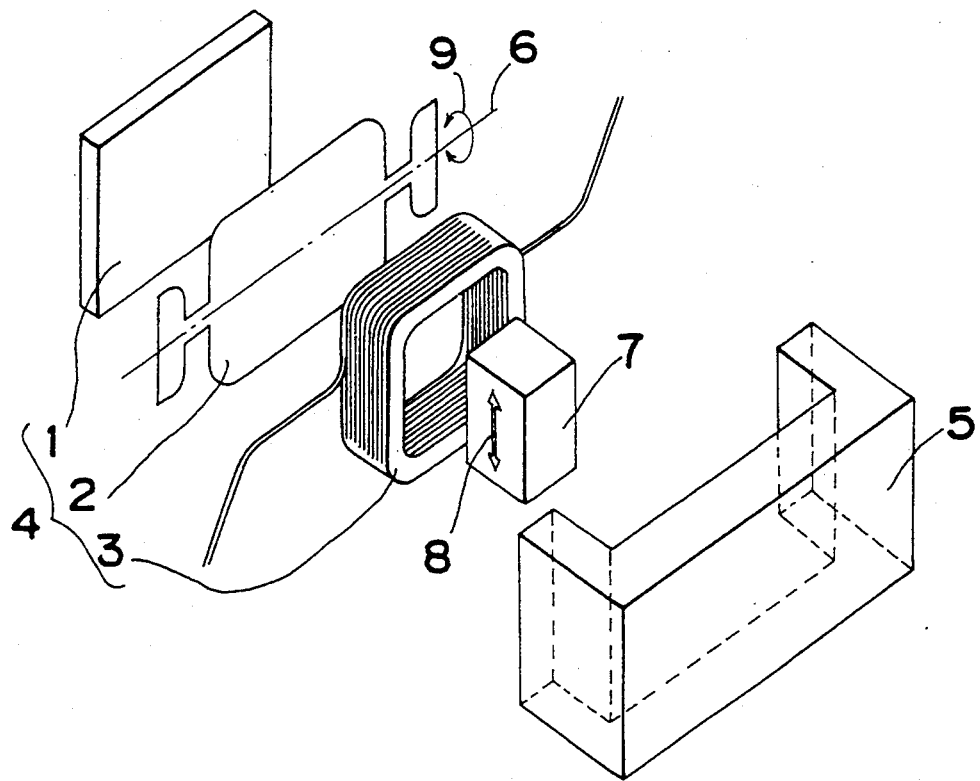
FIGS. 9(a) and 9(b) are exploded perspective views of the conventional mirror driving apparatus.
Figure 9B:
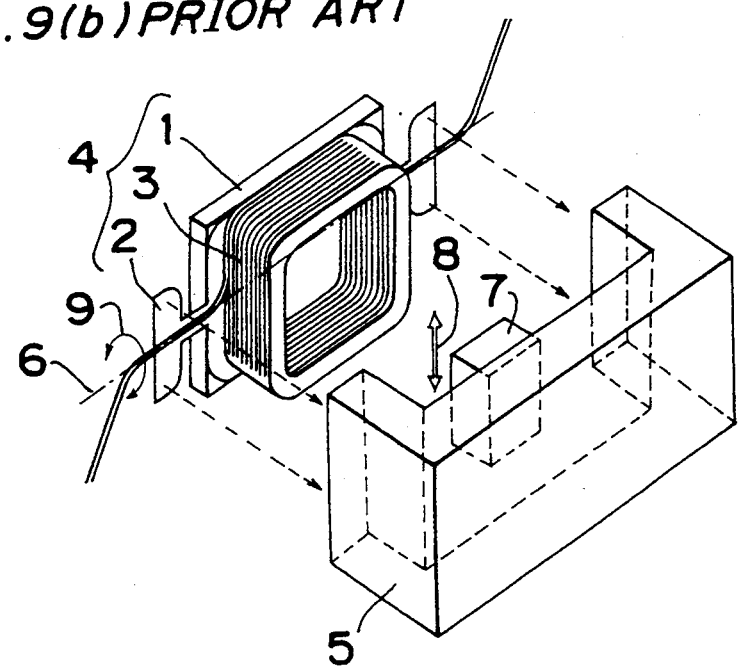

Referring next to FIG. 7, there is shown a second embodiment of a mirror driving apparatus according to the present invention will be described.

In the embodiment of FIG. 7, the structure of the mirror driving apparatus is generally similar to that of the conventional apparatus described earlier with reference to FIGS. 8(a) to 9(a), and so a detailed description thereof will be omitted here for the sake of brevity, with like parts being designated by like reference numerals. An additional high frequency component outside the control band of the rotary mirror 1 is represented by numeral 33, a tracking control signal is represented by numeral 31, an adder is denoted by numeral 34, a driving circuit is denoted by numeral 10, and an added driving control signal is represented by numeral 32.

The operation of the mirror driving apparatus will be described hereinafter.

In the first place, the tracking control signal 31 and the additional high frequency component 33 are added by the adder 34, and the driving control signal 32 thus added by the adder 34 is passed through the driving circuit 10 so that the current corresponding to the driving control signal 32 is passed through the driving coil 3 connected therewith. As a result, the driving coil 3 is subjected to an electromagnetic force corresponding to the driving control signal 32 from the permanent magnet 7, and the rotary section 4 constituted by the driving coil 3, plate spring 2, and the rotary mirror 1 is rotated in the rotating direction 9 about the rotary axis 6. By using the above-described system, it becomes possible to effect a reflected light displacement control of the laser light (not shown) irradiated onto the rotary mirror 1, and thus, tracking control in the optical disk apparatus is realized. Moreover, since the driving control signal 32 is superposed with the additional high frequency component 33 outside the tracking control band of the rotary mirror 1, the rotary mirror 1 is finely moved at the high frequency outside the control band at all times, and thus, non-linear characteristics such as stationary friction, etc. may be eliminated. Consequently, the dead band region (hysteresis characteristic) of the mechanical vibrating system constituted by the rotary mirror and the mirror support member is further reduced, and the initial setting angle of the rotary mirror 1 can be maintained with a high degree of accuracy. Meanwhile, since the rotary mirror 1 is finely moving at the high frequency outside the tracking control region, there is no obstruction to the original tracking control.

It is needless to say that, by combining the features of the first and second embodiments, two improvements in the tracking control actuator, i.e. reduction of the dead band region (hysteresis characteristic) of the rotary mirror, and suppression of the resonance value at the initial resonance frequency, can be simultaneously implemented.

Although the present invention has been fully described by way of example with reference to the accompanying drawings, it is to be noted here that various changes and modifications will be apparent to those skilled in the art. Therefore, unless such changes and modifications otherwise depart from the scope of the present invention, they should be construed as included therein.

What is claimed is:

1. A mirror driving apparatus comprising: a rotating section including a rotary mirror, and a support member on which the rotary mirror is supported so as to be rotatable about a fixed axis of rotation; driving means for rotating said rotary mirror about said fixed axis of rotation; a rotary electrode mounted on said rotary section so as to rotate about said axis with said rotary mirror; a fixed electrode disposed close to the rotary electrode and generally parallel thereto, one of said rotary electrode and said fixed electrode having a plurality of portions spaced from one another on opposite sides of said axis of rotation of said rotary mirror; a fixing section to which said support member and said fixed electrode are mounted; and detecting means for detecting at least two electrostatic capacities or changes thereof between said plurality of portions of said one of said rotary and said fixed electrodes and the other electrode, respectively.

2. A mirror driving apparatus as claimed in claim 1, wherein one of said rotary electrode and said fixed electrode includes a charging film.

3. A mirror driving apparatus as claimed in claim 1, wherein said fixed electrode is so disposed as to become closest to said rotary electrode when said rotary mirror has been rotated a predetermined amount from an initial stationary position whereat the mirror rests when not driven by said driving means.

4. A mirror driving apparatus as claimed in claim 1, wherein said support member is electrically conductive.

5. A mirror driving apparatus as claimed in claim 1, wherein said driving means includes a magnetic circuit.

6. A mirror driving apparatus as claimed in claim 1, wherein said driving means includes a driving coil and a magnetic circuit.

7. A mirror driving apparatus as claimed in claim 1, wherein said support member is a plate spring which biases said rotary mirror to a stationary center position.

8. A mirror driving apparatus comprising: a rotary mirror supported in the apparatus so as to be rotatable about a fixed axis of rotation extending along a longitudinal center line of the mirror dividing the mirror in half; a rotary electrode integral with said rotary mirror so as to rotate therewith; a fixed electrode fixed in the apparatus and confronting said rotary electrode such that a distance between said rotary electrode and said fixed electrode varies as said rotary mirror rotates about said fixed axis, at least one of said fixed and said rotary electrodes having a plurality of portions spaced from one another on opposite sides of said fixed axis of rotation; and detecting means for detecting electrostatic capacities or changes thereof between said plurality of portions of said at least one of said fixed and said rotary electrodes and the other of said electrodes.

9. A mirror driving apparatus as claimed in claim 8, wherein one of said fixed and said rotary electrodes includes an electret film.

10. A mirror driving apparatus as claimed in claim 8, and further comprising a spring to which said rotary mirror is mounted, said spring being twistable about said fixed axis of rotation.

11. A mirror driving apparatus as claimed in claim 8, and further comprising drive means for rotating said mirror about said fixed axis of rotation.

* * * * *